(12) United States Patent
Bumiller et al.

(10) Patent No.: US 8,750,924 B2
(45) Date of Patent: Jun. 10, 2014

(54) SYSTEM AND METHOD OF HANDSET CONFIGURATION BETWEEN CELLULAR AND PRIVATE WIRELESS NETWORK MODES

(75) Inventors: George Baldwin Bumiller, Ramsey, NJ (US); Adrian Buckley, Tracy, CA (US)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/428,488

(22) Filed: Mar. 23, 2012

(65) Prior Publication Data

US 2012/0178499 A1 Jul. 12, 2012

Related U.S. Application Data

(63) Continuation of application No. 11/246,759, filed on Oct. 7, 2005, now abandoned.

(51) Int. Cl.
H04M 1/00 (2006.01)

(52) U.S. Cl.
USPC ............ 455/552.1; 455/422.1; 455/443; 370/328

(58) Field of Classification Search
USPC .......... 455/552, 552.1, 452.1, 436, 440, 443, 455/422.1, 432.1, 554.1; 370/328, 331, 370/338, 352
See application file for complete search history.

(56) References Cited

U.S. PATENT DOCUMENTS

| | | | |
|---|---|---|---|
| 5,504,803 A * | 4/1996 | Yamada et al. | 455/426.1 |
| 6,321,097 B1 * | 11/2001 | Kim | 455/553.1 |
| 6,687,243 B1 * | 2/2004 | Sayers et al. | 370/356 |
| 6,829,480 B1 | 12/2004 | Hoglund et al. | |
| 6,961,593 B1 | 11/2005 | Lonka et al. | |
| 6,993,359 B1 * | 1/2006 | Nelakanti et al. | 455/554.1 |
| 7,089,005 B2 * | 8/2006 | Reddy | 455/436 |
| 7,133,646 B1 | 11/2006 | Miao | |
| 7,171,199 B1 | 1/2007 | Rahman | |
| 7,254,129 B2 | 8/2007 | Kishi | |
| 7,272,397 B2 | 9/2007 | Gallagher et al. | |

(Continued)

FOREIGN PATENT DOCUMENTS

| | | |
|---|---|---|
| CN | 1547411 A | 11/2004 |
| CN | 1604548 A | 4/2005 |

(Continued)

OTHER PUBLICATIONS

Examination report mailed Oct. 17, 2007. In corresponding application No. 2006225272.

(Continued)

Primary Examiner — Mahendra Patel
(74) Attorney, Agent, or Firm — Novak Druce Connolly Bove + Quigg LLP

(57) ABSTRACT

A switchable configuration system and method for switchably configuring a handset between private wireless network and cellular modes is provided. The switchable configuration system comprises a cellular module adapted to operate the handset in a cellular mode, a private wireless network module adapted to operate the handset in a private wireless network mode, and a configuration module adapted to determine which mode to configuring the handset. The method comprises the steps of determining if private wireless network coverage is available, in response to determining that private wireless network coverage is available selecting the private wireless network mode, and in response to determining that private wireless network coverage is not available selecting the cellular mode.

22 Claims, 8 Drawing Sheets

(56) References Cited

U.S. PATENT DOCUMENTS

| | | |
|---|---|---|
| 7,496,360 B2 * | 2/2009 | Sindhwani et al. ........ 455/422.1 |
| 2002/0080739 A1 | 6/2002 | Kuwahara |
| 2002/0137472 A1 * | 9/2002 | Quinn et al. .................. 455/90 |
| 2003/0176186 A1 | 9/2003 | Mohammed |
| 2003/0214961 A1 | 11/2003 | Nevo et al. |
| 2004/0029612 A1 | 2/2004 | Gorsuch |
| 2004/0066756 A1 | 4/2004 | Ahmavaara et al. |
| 2004/0116115 A1 | 6/2004 | Ertel |
| 2004/0165563 A1 | 8/2004 | Hsu et al. |
| 2004/0166874 A1 | 8/2004 | Asokan et al. |
| 2004/0259587 A1 | 12/2004 | Chadha |
| 2004/0264410 A1 | 12/2004 | Sagi |
| 2005/0148362 A1 | 7/2005 | Jagadeesan et al. |
| 2005/0190747 A1 | 9/2005 | Sindhwani et al. |
| 2005/0202823 A1 * | 9/2005 | Shaheen et al. ............... 455/436 |
| 2006/0012580 A1 * | 1/2006 | Perski et al. .................. 345/173 |
| 2006/0077986 A1 | 4/2006 | Rune |
| 2006/0221901 A1 | 10/2006 | Yaqub et al. |
| 2006/0264212 A1 | 11/2006 | Sekhar |
| 2007/0026866 A1 | 2/2007 | Krishnamurthi et al. |

FOREIGN PATENT DOCUMENTS

| | | | |
|---|---|---|---|
| CN | 1606891 | A | 4/2005 |
| JP | 2000196736 | | 7/2000 |
| JP | 2001500327 | | 1/2001 |
| JP | 2003510897 | A | 3/2003 |
| JP | 2004088154 | A | 3/2004 |
| JP | 2004186749 | A | 7/2004 |
| JP | 2004201031 | | 7/2004 |
| JP | 2004304409 | A | 10/2004 |
| JP | 2005101820 | | 4/2005 |
| JP | 200512646 | A | 8/2006 |
| WO | 02054820 | | 7/2002 |
| WO | 03061177 | A2 | 7/2003 |
| WO | 2004095803 | | 11/2004 |

OTHER PUBLICATIONS

Examination report mailed Apr. 20, 2007. In corresponding application No. 05109314.4.

English Abstract for JP2000196736, published Jul. 14, 2000 and retrieved on Aug. 20, 2009.

English Abstract for JP2004201031, published on Jul. 15, 2004 and retrieved on Aug. 20, 2009.

English Abstract for JP2005101820, published on Apr. 14, 2005 and retrieved on Aug. 20, 2009.

English abstract for JP2005-012646, published Jan. 13, 2005 and retrieved on Mar. 22, 2012.

Denial of Entry of Amendment mailed Apr. 2, 2012 ; in corresponding Japanese patent application No. 2006-275801.

Translation of the Denial of Entry of Amendment mailed Apr. 2, 2012; in corresponding Japanese patent application No. 2006-275801.

Office Action mailed Mar. 21, 2012; in corresponding Japanese patent application No. 2006-275801.

English translation of Office Action mailed Mar. 21, 2012; in corresponding Japanese patent application No. 2006-275801.

Office Action mailed Jul. 15, 2011; in corresponding Japanese patent application No. 2006275801.

The First Office Action mailed Nov. 15, 2013, in corresponding Chinese patent application No. 201110353053.8.

English translation of the First Office Action mailed Nov. 15, 2013, in corresponding Chinese patent application No. 201110353053.8.

English abstract for CN1547411; published on Nov. 17, 2004 and retrieved on Jan. 10, 2014.

English abstract for CN1604548; published on Apr. 6, 2005 and retrieved on Jan. 10, 2014.

English abstract for CN1606891; published on Apr. 13, 2005 and retrieved on Jan. 10, 2014.

* cited by examiner

SYSTEM AND METHOD OF HANDSET CONFIGURATION BETWEEN CELLULAR AND PRIVATE WIRELESS NETWORK MODES

CROSS REFERENCE TO RELATED APPLICATIONS

This application is a continuation of U.S. patent application No. 11/246,759 filed on Oct. 7, 2005, the contents of said application being incorporated herein by reference.

TECHNICAL FIELD

This patent document relates generally to communication networks, and in particular to a system and method of handset configuration between cellular and private wireless network modes.

BACKGROUND

Wireless access networks have become a key element of a variety of telecommunications network environments. As to enterprise networks, they provide convenient access to network resources for workers carrying portable computers and mobile handheld devices, and for guests or temporary workers similarly equipped. They also provide a cost-effective alternative to relocating physical Ethernet jacks in environments where facilities are moved or changed frequently. In addition, wireless access points operable with diverse communication/computing devices are becoming ubiquitous in public environments such as, e.g., hotels, airports, restaurants, and coffee shops. With the increase in high-speed Internet access, the use of access point(s) in the users' homes is also envisioned and has started for other applications.

A dual-mode handset, including both cellular and WLAN bands, is used for enterprise operation on an enterprise campus using WLAN. However, when off the enterprise campus, the cellular communications capability is used. It is desirable to be able to easily switch the WLAN transceiver between 3rd generation partnership project (3GPP) (cellular) mode and enterprise mode, without manual intervention and while conforming to the 3GPP cellular standards and satisfying the 3GPP conformance tests. Unfortunately, when the handset has the WLAN transceiver working as part of the cellular configuration, there is no way for the handset to change back to the "enterprise on WLAN" configuration. The cellular (3GPP) specifications do not sense when the handset is back on the enterprise campus (or when it goes off the enterprise campus). Moreover, the cellular (3GPP) specifications do not permit the cellular handset to change its configuration to remove or enable enterprise WLAN operation.

A cellular handset with both GSM-family capability and code division multiple access (CDMA)-family capability currently must operate in one configuration or the other, i.e., in GSM-relate mode or in CDMA-related mode. Switching between these two modes is done through a "knife-switch" program, that shuts down GSM (or CDMA) completely, and then restarts the handset in the other CDMA (or GSM) configuration.

The "knife-switch" would simply set the handset to one or the other configuration, as described. It can not do more. There is a need for a terminal that will operate on cellular, operate on enterprise WLAN, and further, be able to operate on cellular I-WLAN or GAN (two 3GPP WLAN capabilities) when there is no enterprise WLAN coverage.

BRIEF DESCRIPTION OF THE DRAWINGS

An embodiment of the patent disclosure will now be described by way of example only with reference to the following drawings in which.

DETAILED DESCRIPTION

Figure 1:
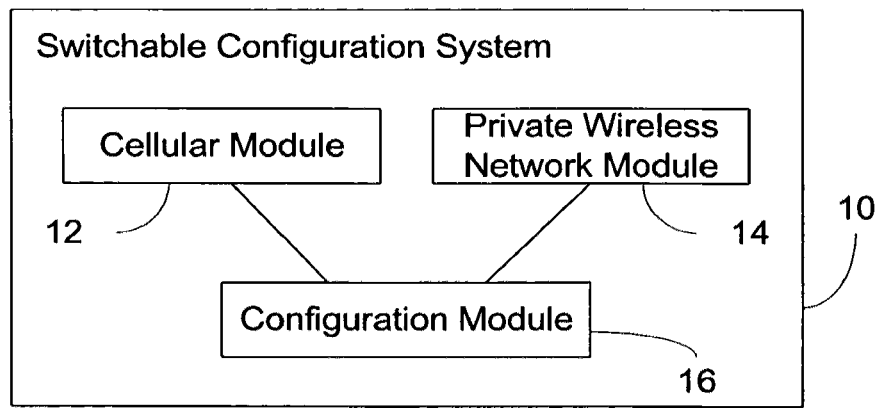
FIG. 1 shows an example of a switchable configuration system for switchably configuring a handset between private wireless network and cellular modes, in accordance with an embodiment of the patent disclosure.

The patent disclosure describes a solution to one or more of the problems described above. A device, while operating with any configured wireless technology as part of the cellular capability, gathers additional information beyond that required by wireless access technology (cellular) specifications, and stores that information where it is accessible to a separate "knife switch" program that can switch the handheld between the two configurations: a) cellular+cellular wireless technology; and b) cellular+private wireless network technology.

In accordance with an embodiment of the patent disclosure, there is provided a switchable configuration system for switchably configuring a handset between private wireless network and cellular modes. The switchable configuration system comprises a cellular module adapted to operate the handset in a cellular mode, a private wireless network module adapted to operate the handset in a private wireless network mode, and a configuration module adapted to determine which mode to configuring the handset.

In accordance with an embodiment of the patent disclosure, there is provided a handheld wireless device comprising a switchable configuration system for switchably configuring a handset between private wireless network and cellular modes. The switchable configuration system comprises a cellular module adapted to operate the handset in a cellular mode, a private wireless network module adapted to operate the handset in a private wireless network mode, and a configuration module adapted to determine which mode to configuring the handset.

In accordance with an embodiment of the patent disclosure, there is provided a computer program product for use in the execution in a handheld electronic device. The handheld electronic device comprises a memory for storing data for access by an application program being executed on a data processing system, and a switchable configuration system for switchably configuring a handset between private wireless network and cellular modes. The switchable configuration system comprises a cellular module adapted to operate the handset in a cellular mode, a private wireless network module adapted to operate the handset in a private wireless network mode, and a configuration module adapted to determine which mode to configuring the handset.

In accordance with an embodiment of the patent disclosure, there is provided a method of switchably configuring a handset between private wireless network and cellular modes. The method comprises the steps of determining if private wireless network coverage is available, in response to determining that private wireless network coverage is available selecting the private wireless network mode, and in response to determining that private wireless network coverage is not available selecting the cellular mode.

In accordance with an embodiment of the patent disclosure, there is provided a computer-readable media for storing instructions or statements for use in the execution in a computer of a method of switchably configuring a handset between private wireless network and cellular modes. The method comprises the steps of determining if private wireless network coverage is available, in response to determining if private wireless network coverage is available selecting the private wireless network mode if available, and in response to determining if private wireless network coverage is not available selecting the cellular mode if private wireless network mode is not available.

A system and method of the patent disclosure will now be described with reference to various examples of how the embodiments can best be made and used. For convenience, like reference numerals are used throughout the description and several views of the drawings to indicate like or corresponding parts, wherein the various elements are not necessarily drawn to scale.

A single-configuration handset, even one with multiple modes, is quite well defined since it is governed by a single set of related specifications. Thus a cellular handset with global system for mobile communication (GSM), general packet radio service (GPRS), enhanced data rates for GSM evaluation (EDGE), universal mobile telecommunications system (UMTS) and even wireless local area network (WLAN) capability such as interworking WLAN (I-WLAN) and generic access network (GAN) is governed entirely by the 3GPP set of specifications.

FIG. 1 shows an example of a switchable configuration system 10 for switchably configuring a handset between private wireless network and cellular modes, in accordance with an embodiment of the patent disclosure. The switchable configuration system 10 comprises a cellular module 12 for operating the handset in a cellular mode, an enterprise private wireless network module 14 for operating the handset in a private wireless network mode, and a configuration module 16 for determining which mode to configure the handset.

The configuration module 16 communicates with both the cellular module 12 and the private wireless network module 14. The configuration module 16 determines which bands are available for a user of the handset. If private wireless network (such as enterprise WLAN) coverage is available, the configuration module 16 selects the private wireless network module 14 as the mode of operation of the handset. If a private wireless network (such as an enterprise WLAN) coverage is not available, the configuration module 16 selects the cellular module 12 as the mode of operation of the handset. The switchable configuration system 10 may be implemented in a user equipment device such as a handset.

Figure 2:
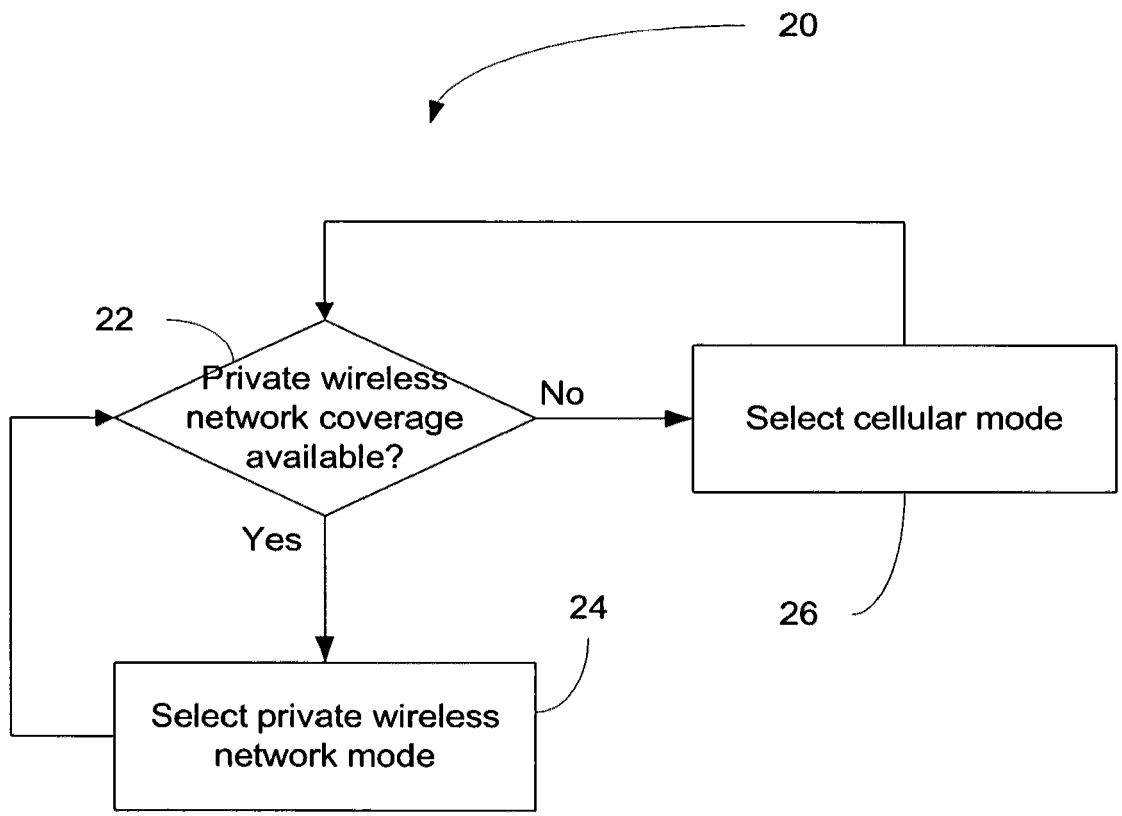
FIG. 2 shows in a flowchart an example of a method of switchably configuring a handset between private wireless network and cellular modes, in accordance with an embodiment of the switchable configuration system.

FIG. 2 shows in a flowchart an example of a method of switchably configuring a handset between private wireless network and cellular modes (20), in accordance with an embodiment of the switchable configuration system. The method (20) begins with determining if private wireless network (such as enterprise coverage) is available (22). If private wireless network (such as enterprise) coverage is available (22) (e.g., by discovering a known SSID by active or passive scanning), then the private wireless network mode is selected (24) as the mode of operation of the handset. Otherwise (22), the cellar mode is selected (26) as the mode of operation of the handset. Step (22) is periodically repeated while the handset is in operation. Other steps may be added to the method.

Advantageously, the switchable configuration system and method make a switchably configurable handset both feasible, and very useful for the private wireless network users that will use it both on the private wireless network campus (es) and other campus(es) where they may have roaming privileges.

In the following description, aspects of the system 10 and method (20) of handset configuration between cellular and private wireless network modes are described using an enterprise as an example of a private wireless network. Moreover, references to specific wireless technology, such as GAN, WLAN, and I-WLAN, are by way of example only. Other wireless technology such as Wi-Max, Wi-Fi, and others may also be adapted. Furthermore, references to specific wireless access technology, such as 3GPP, are by way of example only. Other wireless access technologies such as Wi-Max, Wi-Fi, BRAN, Bluetooth and others may also be adapted. Furthermore, specific reference to a cellular—enterprise handset is an example of a handset used in cellular or private wireless network communication.

The switchable configuration system uses several features to enhance the operation of a cellular—enterprise handset, while conforming to the cellular specifications and while enabling the handset to successfully pass the conformance testing. Advantageously, these features and enhancements make the handset both feasible, and very useful for the enterprise people (i.e., private wireless network users) that will use it both on the enterprise campus(es) and other campus(es) where they may have roaming privileges. Using a cellular PC card in a PC enables a PC software program to get information about the cellular system, and perform actions based on that information. Preferably, the card itself does not perform those actions.

Figure 3:
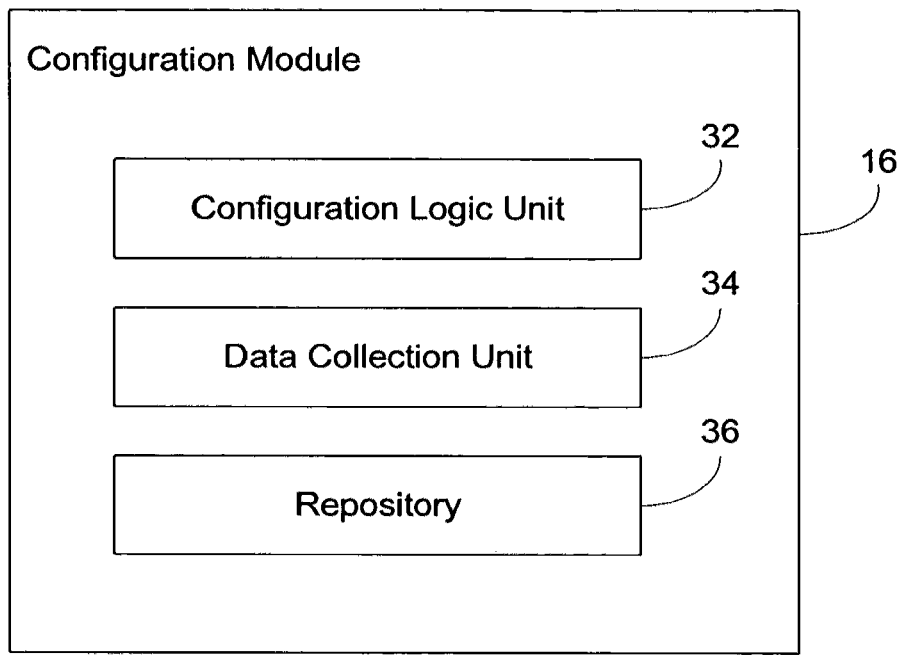
FIG. 3 shows in a functional block diagram an example of a configuration module for determining which mode to configure a cellular—enterprise handset, in accordance with an embodiment of the switchable configuration system.

FIG. 3 shows in a functional block diagram an example of a configuration module 16 for determining which mode to configure a cellular—enterprise handset, in accordance with an embodiment of the switchable configuration system. The configuration module 16 comprises a configuration logic unit 32 for determining and selecting modes of operation of the cellular—enterprise handset, a data collection unit 34 for determining collecting cellular and enterprise WLAN bands that are available, and a repository 36 for storing data collected by the data collection module 34. Other units may be added to the configuration module 16. The configuration module 16 may be implemented in a user equipment device such as a cellular—enterprise (private wireless network) handset.

The capabilities provided by the configuration module 16 include an enhanced high-level configuration control program (i.e., configuration logic unit 32) or EHCCP (akin to the PC program in a PC with a cellular card module), in place of the simple manually-controlled "knife switch". The capabilities also include the data collection module 34 having the ability to capture information on cellular and WLAN networks while the WLAN is controlled by the cellular portion of the handset, and storing that information so as to be accessible to an enhanced high-level configuration control program 32. Furthermore, the capabilities include the data collection module 34 having the ability to capture other location information such as A-GPS (assisted GPS). However, when the handset is operating where there is no campus (i.e., enterprise or similar) WLAN coverage, the WLAN transceiver may be controlled by the cellular portion of the handset, depending on configuration settings.

Figure 4:
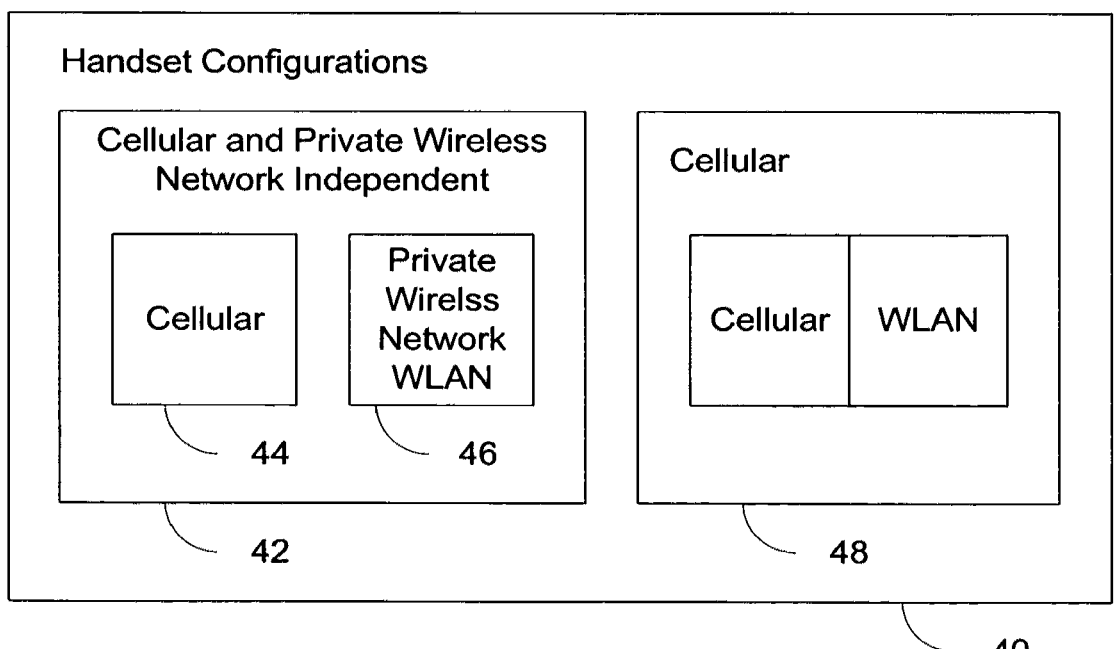
FIG. 4 illustrates two configurations of the handset, in accordance with an embodiment of the switchable configuration system.
Figure 5:
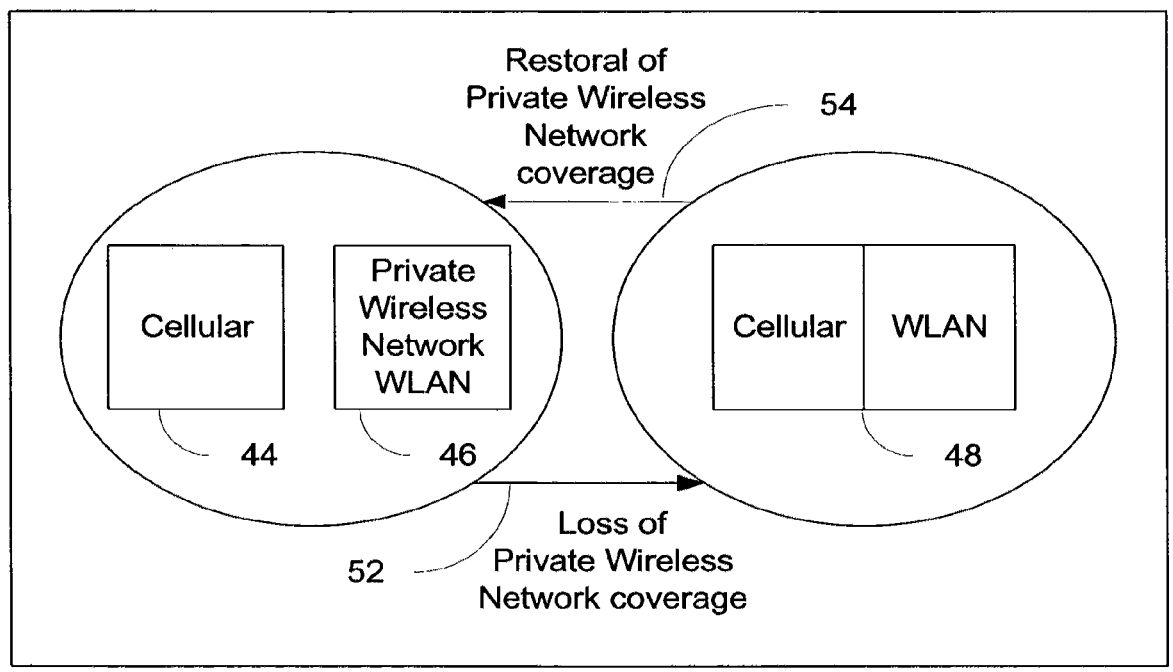
FIG. 5 illustrates the restoral and loss of private wireless network coverage cycle, in accordance with an embodiment of the switchable configuration system.

FIG. 4 illustrates the two configurations of the handset, in accordance with an embodiment of the switchable configuration system. The cellular and private wireless networks (e.g., enterprise) independent configuration 42 operates a cellular 44 and private wireless network (e.g., enterprise) 46 WLAN independently. The cellular controlling WLAN configuration 48 does not have enterprise coverage capabilities. Preferably, the private wireless network (WLAN or other) module in configuration 48 operates as part of the cellular network, using (for GSM networks) I-WLAN or GAN protocols. FIG. 5 illustrates the loss and restoration private wireless network (e.g., enterprise) coverage cycle 50, in accordance with an embodiment of the switchable configuration system. The loss 52 and restoration 54 of enterprise coverage is determined by the background EHCCP program (or configuration logic unit 32) that periodically checks the location and other data.

Figure 6:
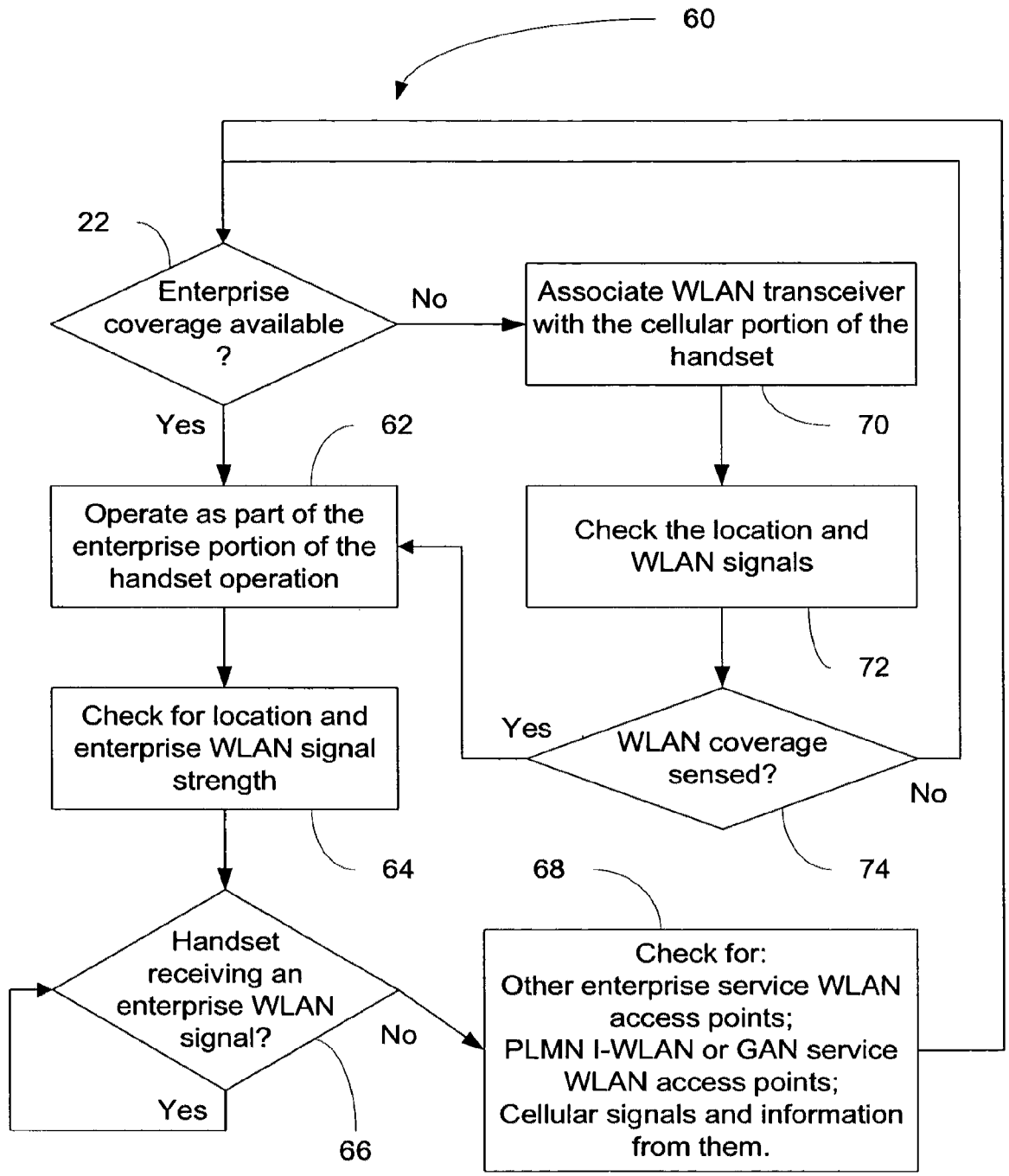
FIG. 6 shows in a flowchart another example of a method of switchably configuring a handset between private wireless network and cellular modes, in accordance with an embodiment of the switchable configuration system.
Figure 7:
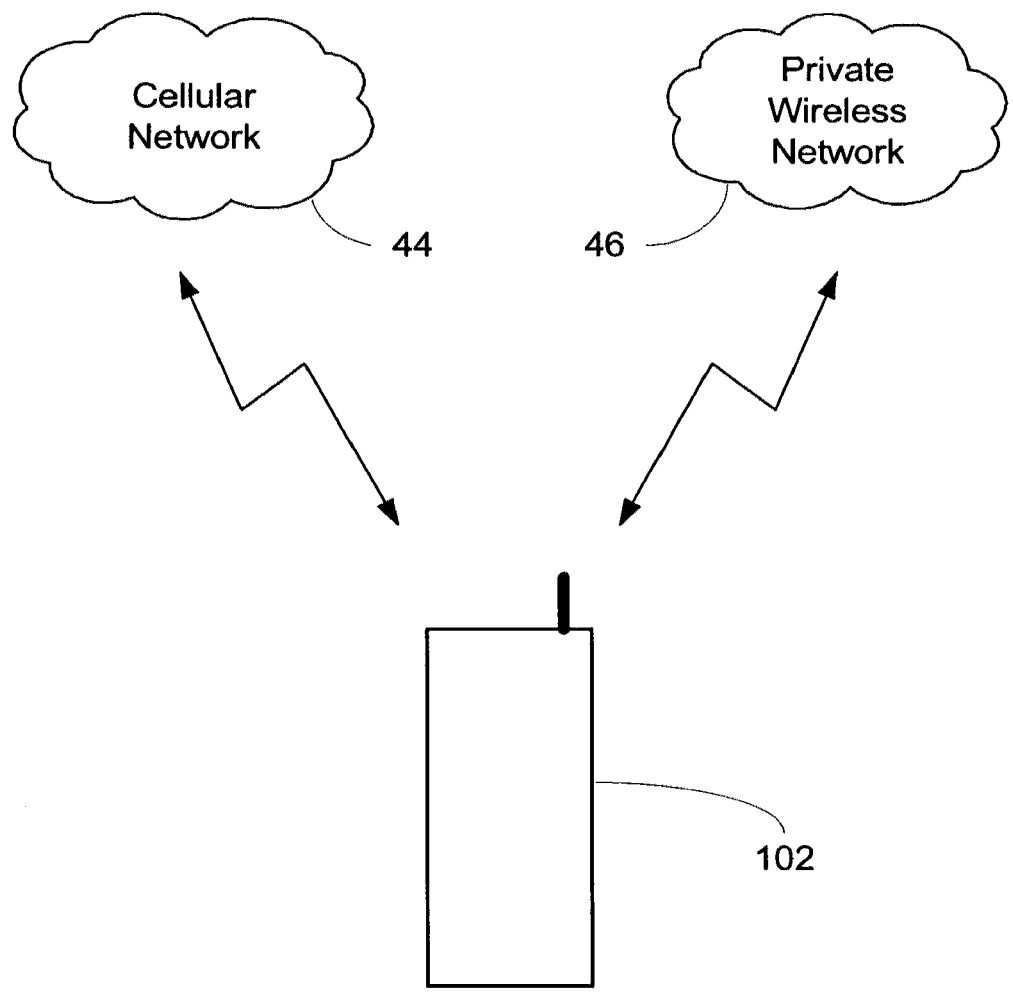
FIG. 7 shows an example of a dual network environment, in accordance with an embodiment of the switchable configuration system.

FIG. 6 shows in a flowchart another example of a method of switchably configuring a handset between private wireless network (e.g., enterprise) and cellular modes, in accordance with an embodiment of the switchable configuration system. In this example, WLAN is used as an example of an enterprise (i.e., private wireless network) band. Other bands may be used for the private wireless network. While the handset is operating in the cellular and enterprise (WLAN is used for the enterprise) (22), the EHCCP 32 functions as part of the enterprise portion of the handset operation (62). The EHCCP (or configuration unit) 32 checks for location and enterprise WLAN signal strength (64). When the handset is no longer receiving an enterprise WLAN signal (66) (including no longer being able to detect via active or passive scanning known enterprise SSIDs) and is off the enterprise campus, the EHCCP checks for (68) other WLAN access points (APs) that may be used for enterprise service, WLAN APs that provide access to PLMN I-WLAN or GAN service, and cellular network (PLMN) signals and the cell identification (CGI) which also provides location information from the cellular portion 44 of the wireless device. The other WLAN access points (APs) that may be used for enterprise service include other WLAN campus(es) that provide "guest" roaming privileges (for example, in one implementation, SSIDs are stored in the wireless device either in removable or non-removable memory), and WLAN "hot spots" (or access points) that the enterprise may be subscribed to and provide low-cost service (for example, in one implementation SSIDs stored in the wireless device). Guest roaming privileges includes the situation where a user visits a company having an enterprise network. The visited company can provide a "guest" log-on for the visitor, allowing use of the visitor's wireless device on the visited company's WLAN.

When there are no enterprise or other low-cost APs (22), but there are APs that may be able to access the PLMN, the EHCCP may, depending on the settings, cause the WLAN transceiver to be associated with the cellular portion of the handset (70). This may be done by restarting the cellular portion of the handset in such a mode (a 'brute force' approach that has no impact on the cellular specifications), or by associating the WLAN with the cellular portion of the handset without restarting the cellular portion of the handset (a more difficult task).

The method shown in FIG. 6 may be modified with the option to remain in the cellular+enterprise mode for a period of time after the private wireless network signal has been lost, rather than instantly associate the WLAN or other private wireless communications module with the cellular control (e.g., retain the handset configuration of 42 rather than change instantly to 48 as illustrated in FIG. 4). This may be preferable if the campus has "spotty" coverage in some areas, so that the handset changes modes less frequently. Similarly, when location information, A-GPS or cellular-signal derived, or other, is available, this may be used to retain the cellular+enterprise mode until the handset is a distance from the enterprise campus.

Once the WLAN transceiver is operating as part of the cellular handset (70), the EHCCP will check the location and WLAN signals periodically (72), according to its settings. When the enterprise (or guest or other acceptable-to-the-enterprise) WLAN coverage is sensed by the EHCCP checking the output to memory of the cellular/WLAN program (74), the EHCCP will cause the handset to be reconfigured to cellular +enterprise, where the WLAN transceiver is controlled by the enterprise program (62).

While the handset is within the enterprise (or guest or other acceptable) WLAN coverage, the handset remains in the cellular +enterprise configuration. When the enterprise coverage is lost, the enterprise program signals the EHCCP (preferred approach) or the EHCCP determines the loss of enterprise WLAN coverage by periodic checking of coverage signal information stored by the enterprise software.

Preferably, the EHCCP is separate from the cellular software; it operates in a manner similar to a PC program does when the cellular capability is contained within a separate hardware module plugged into the PC. That is, the EHCCP is either on a separate processor module or be a separate program on a multi-program-capable processor. The EHCCP is capable of being set to check the location and coverage information at different intervals, dependent on its settings, and enable or disable certain configurations.

Operation While the Mobile has a Call from Only One of the Networks
(Cellular or Private Wireless Network)

When the cellular (GSM) connection is active its operation is similar to the situation where there is no call on the cellular side but the private wireless network has a call.

In the GSM operation, call hold and conference calling is specified. It uses the network to provide the appropriate voice call signal over the cellular channel between the PLMN and the mobile station. When call hold is in use, the network places a call on hold when commanded by the user, retrieves the call, or disconnects the held call. There is only a single cellular voice traffic channel. Should a user place a call on hold such that a second call can be made, the network performs the action of setting up another call while the first one is on hold.

If a served mobile subscriber has a call on hold and is not connected to an active call, the user can: 1) Retrieve the held call; 2) Set up another call; or 3) Disconnect the held call. The user may, depending on the capabilities and specifications of that network, place an active call on hold to accept another incoming call from that network.

If the served mobile subscriber is connected to an active call and has another call on hold, the user can: 1) Alternate from one call to the other; 2) Conference the two calls; 3) Disconnect the active call; 4) Disconnect the held call; or 5) Disconnect both calls. This is accomplished by the network in response to user signals (commands from the handset).

The cellular operation is well defined by the appropriate specifications, whether it is GSM-based, CDMA-based, or other. The operation, when the call is a private wireless network call, conforms to the specifications that have been adopted for that operation. Only a single system, cellular or private wireless, is involved.

Operation with Calls on Both Cellular and Private Wireless Networks.

The characteristics of the two voice channels and the related signalling (cellular and private wireless) are different. Further, the two networks do not have (or at least are not required to have) any direct network-to-network connectivity.

With a single microphone and speaker, a user can, with a call on hold on the cellular network C, retrieve the held cellular call, set up another call, or disconnect the held call. When setting up another call, the user can set up the other call on the cellular network or on the private wireless network. Setting up another call on the cellular network uses the signalling specified for cellular network. Setting up another call on the private wireless network uses the signalling specified for the private wireless network. The higher level function EHCCP will enable the user to select which network the another call is to be set up on.

When the new call is set up on the other network, (e.g., the private wireless network) the cellular network with the held call is not involved. The user selects, via a higher level function (EHCCP) the network over which the new call should be placed.

When the new call is on the other network, then the signaling is over that network connection and the specified control procedures for that network are used.

Switching back and forth between the two calls (e.g., placing one call on hold and then retrieving the other) involves a higher-level (EHCCP) to place the hold and the retrieve commands through the handset controls for the appropriate networks.

It is possible to have more than one call on the cellular network (It may also be possible to have two or more calls on the private wireless network.). With two or more calls on the cellular network and one on the private wireless network (or vice-versa), the user's control becomes more complex, though not impossible. The EHCCP function allows the call hold and retrieve to be simplified, so that it is no more complex for the user (once the calls are set up) than having all the calls on one the cellular network or on the private wireless network.

The EHCCP interfaces with the call control functions of both the cellular portion of the handset and the private wireless portion of the network. The signalling of the two networks will almost certainly be different: the private wireless network will often use Session Initiation Protocol (SIP).

Conferencing of Calls on the Two Networks (Cellular and Private Wireless)

Conferencing may be accomplished through the operation of the two network connections simultaneously, with the signals being mixed in the handset.

Simultaneous operation of two vocoders in the handset are used: one for the cellular network and one for the private wireless network. There may be speech degradation (loss of quality and understandability), depending on the two vocoders in use.

Control and Policy

In the operation of call hold and call conferencing, the limitations of each of the networks (cellular and private wireless) are also limiting on the handset. Further restrictions may be placed on the handset through policy control, e.g., by the information technology (IT) group of the enterprise operating the private wireless network.

Figure 8:
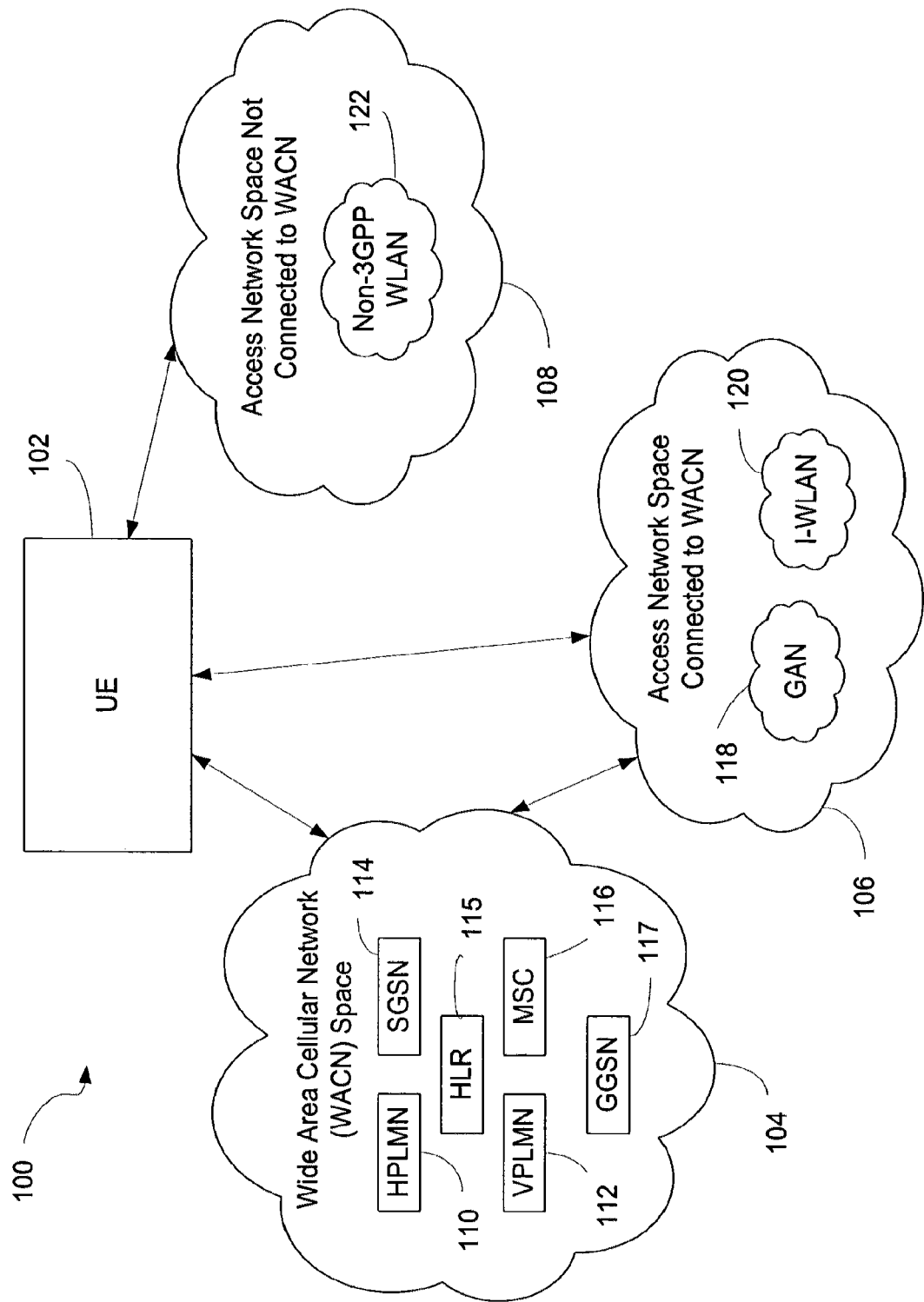
FIG. 8 depicts a generalized network environment wherein an embodiment of the switchable configuration system may be practiced.

Example of Configurations of a Dual Mode Enterprise (i.e., Private Wireless Network) Handset 1. Enterprise FIG. 8 shows an example of a dual network environment, in accordance with an embodiment of the switchable configuration system. A UE 102 may access the cellular network 44 or the private wireless network 46.

The WLAN transceiver in the handset operates with the enterprise campus WLAN network. The cellular transceiver in the handset operates with the PLMN (i.e., cellular network). Both operate simultaneously, but only one at a time will have access to the microphone and speaker—a wireless call will be on the enterprise network or on the cellular network.

Simultaneous enterprise and cellular calls involves conferencing or placing one of the calls on 'hold'. The protocols and operation of enterprise and cellular are each governed by their respective specifications. This simultaneous operation of the cellular and the private wireless network components of the handset enables a call on one network to be conferenced with a call (received by the handset or originating from the handset) on the other network 2. Cellular with I-WLAN or GAN The WLAN transceiver in the handset is controlled by the cellular transceiver, and operates in either the I-WLAN or GAN mode. It is governed by 3GPP specifications. The cellular transceiver in the handset operates with the PLMN (i.e., cellular network). When the WLAN senses an AP, in addition to the information it gathers that is required by the cellular (3GPP specifications), it gathers sufficient information to determine whether the AP is an enterprise campus AP, a guest-capable AP, or another AP of interest to the 'enterprise operation'. It writes this extra information to a location known to the EHCCP, but the GAN or I-WLAN software or system does not itself make any use of this extra information.

Since the WLAN transceiver is controlled by the cellular transceiver, there is no enterprise capability, and the handset's cellular control function will not know that it has returned to the enterprise campus from any WLAN signal. The cellular (3GPP) specifications consider enterprise operation outside the scope of 3GPP. However, the geographic location information (A-GPS or cellular CGI) may be used to indicate to the configuration module that the handset is in or near the private wireless network (enterprise campus) coverage area.

Example of a System Environment

FIG. 8 depicts an exemplary generalized network environment 100 wherein an embodiment of the switchable configuration system may be practiced. A handset or user equipment (UE) device 102 may comprise any portable computer (e.g., laptops, palmtops, or handheld computing devices) or a mobile communications device (e.g., cellular phones or dataenabled handheld devices capable of receiving and sending messages, web browsing, et cetera), or any enhanced personal digital assistant (PDA) device or integrated information appliance capable of electronic mail, video mail, Internet access, corporate data access, messaging, calendaring and scheduling, information management, and the like, that is preferably operable in one or more modes of operation. For example, UE device 102 may operate in the cellular telephony band frequencies as well as wireless local area network (WLAN) bands, or possibly in the WLAN bands alone. Further, other bands in which the UE device could operate wirelessly may comprise Wi-Max bands or one or more satellite bands or ISM bands or other unlicensed bands. Additionally, the network environment 100 is comprised of three broad categories of communication spaces capable of providing service to UE device 102. In wide area cellular network (WACN) space 104, there may exist any number of public land mobile networks (PLMNs) that are operable to provide cellular telephony services which may or may not include packet-switched data services. Depending on the coverage area(s) and whether the user is roaming, WACN space 104 can include a number of home networks (i.e., home PLMNs or HPLMNs) 110, visited networks (i.e., VPLMNs) 112, each with appropriate infrastructure such as home location register (HLR) nodes 115, mobile switching center (MSC) nodes 116, and the like. Since the WACN space 104 may also include a general packet radio service (GPRS) network that provides a packet radio access for mobile devices using the cellular infrastructure of a global system for mobile communications (GSM)-based carrier network, a serving GPRS support node (SGSN) 114 and gateway GPRS support node (GGSN) 117 are exemplified therein. Additionally, by way of generalization, the PLMNs of the WACN space 104 may comprise networks selected from the group consisting of an enhanced data rates for GSM evolution (EDGE) network, an integrated digital enhanced network (IDEN), a code division multiple access (CDMA) network, a universal mobile telecommunications system (UMTS) network, or any 3rd generation network (e.g., 3GPP or 3GPP2), all operating with well known frequency bandwidths and protocols. Other wireless technologies may be used, including Wi-Max, a network of WLANs, and satellite based systems, to name a few.

Further, UE device 102 is operable to obtain service from an access network (AN) space 106 that is connected to the WACN space 104. In one implementation, the AN space 106 includes one or more generic access networks (GANs) 118 as well as any type of WLAN arrangements 120. GAN 118, described in additional detail below, is operable to provide access services between UE device 102 and a PLMN core network using a broadband Internet protocol (IP)-based network. WLAN arrangements 120 provide short-range wireless connectivity to UE device 102 via access points (APs) or "hot spots," and can be implemented using a variety of standards, e.g., IEEE 802.11b, IEEE 802.11a, IEEE 802.11g, HiperLan and HiperLan II standards, Wi-Max standard, OpenAir standard, and the Bluetooth standard.

In one embodiment, interfacing between the WACN and AN spaces may be effectuated in accordance with certain standards. For instance, GAN 118 may be interfaced with a PLMN core using the procedures set forth in the 3GPP TR 43.901 and 3GPP TS 43.318 documents as well as related documentation. Likewise, WLAN 120 may interfaced with a PLMN core using the procedures set forth in the 3GPP TS 22.234, 3GPP TS 23.234 and 3GPP TS 24.234 documents as well as related documentation, and may therefore be referred to as an interworking WLAN (I-WLAN) arrangement.

Additionally, there may exist an access network (AN) space 108 not interfaced to the WACN space 104 that offers short-range wireless connectivity to UE device 102. For instance, AN space 108 may comprise WLANs 122 offering non-3GPP services, such as communications over "public" access points (hotels, coffee shops, bookstores, apartment buildings, educational institutions, etc., whether free or for fee), enterprise access points, and visited (other enterprise) access points where the user may not be a member of that enterprise but is allowed at least some services.

Given the mosaic of the network environment 100 in which UE device 102 may be disposed, it is desirable that a vertical handover mechanism exists such that the user can engage in a call as it moves from a PLMN's radio access network (RAN) to GAN (i.e., handover in) or from GAN to the PLMN's RAN (i.e., handover out). In order to facilitate such functionality as well as to customize and enhance the overall user experience associated therewith, the present patent disclosure provides a suite of network discovery and selection procedures operable with UE device 102 that involve one or more correlation and filtering schemes such that a more customizable handover call behavior can seamlessly take place in the generalized network environment 100.

Figure 9:
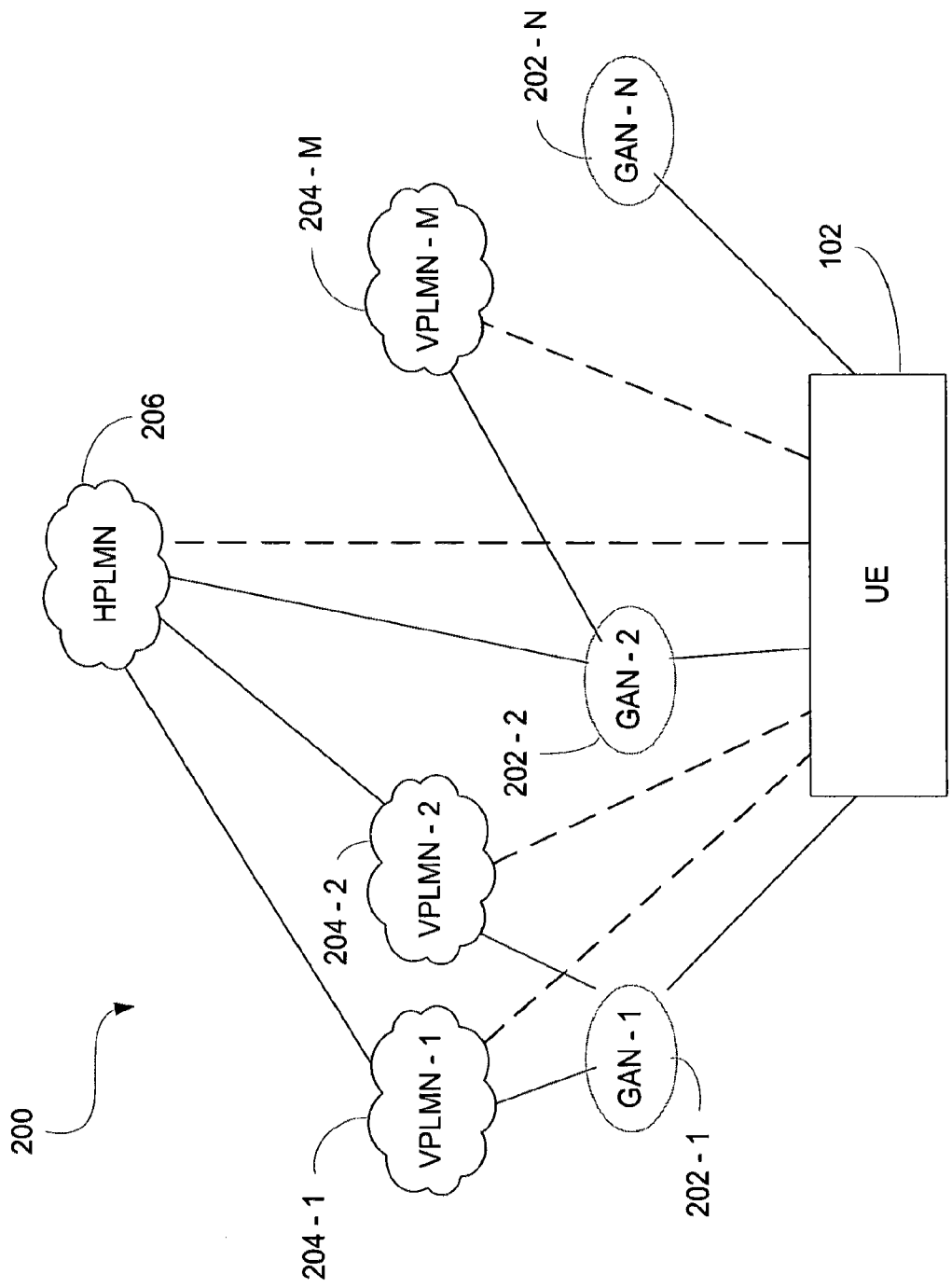
FIG. 9 depicts an exemplary embodiment of a network environment where a user equipment device is operably disposed for network discovery and selection in accordance with the teachings of the switchable configuration system.

To formalize the teachings of the present disclosure, reference is now taken to FIG. 9 wherein an exemplary embodiment of a network environment 200 is shown that is a more concrete subset of the generalized network environment 100 illustrated in FIG. 8. As depicted, UE device 102 is operably disposed for discovering a set of PLMNs that allow access via conventional RAN infrastructure in addition to having connectivity with one or more GANs accessible to UE device 102. By way of example, GAN-1 202-1 through GAN-N 202-N, which are now generalized for purposes of the present patent disclosure to also include any type of WLAN and/or I-WLAN arrangements (known or heretofore unknown), are operable to be discovered by UE device. A GAN AP may support connectivity to one or more PLMNs, which can include VPLMNs 204-1 through 204-M as well as HPLMNs (e.g., HPLMN 206) with respect to UE device 102. Where GAN-PLMN connectivity is supported, which PLMNs behind a particular GAN are visible to UE device 102 may depend on a number of commercial factors, e.g., contractual arrangements between GAN operators and PLMN operators. As illustrated, GAN-1 202-1 supports connectivity to VPLMN-1 204-1 and VPLMN-2 204-2. Likewise, GAN-2 202-1 supports connectivity to VPLMN-M 204-M as well as to HPLMN 206. On the other hand, GAN-N 202-N has no connectivity to the wide area PLMNs.

Each of the wide area cellular PLMNs may be arranged as a number of cells, with each cell having sectors (e.g., typically three 120-degree sectors per base station (BS) or cell). Each individual cell is provided with a cell global identification (CGI) parameter to identify them. A group of cells is commonly designated as a location area (LA) and may be identified by an LA identifier (LAI). At the macro level, the PLMNs may be identified in accordance with the underlying cellular technology. For example, GSM-based PLMNs may be identified by an identifier comprised of a mobile country code (MCC) and mobile network code (MNC). The CDMA/TDMA-based PLMNs may be identified by a system identification (SID) parameter. Regardless of the cellular infrastructure, all cells broadcast the macro level PLMN identifiers such that a wireless device (e.g., UE device 102) wishing to obtain service can identify the wireless network.

Figure 10:
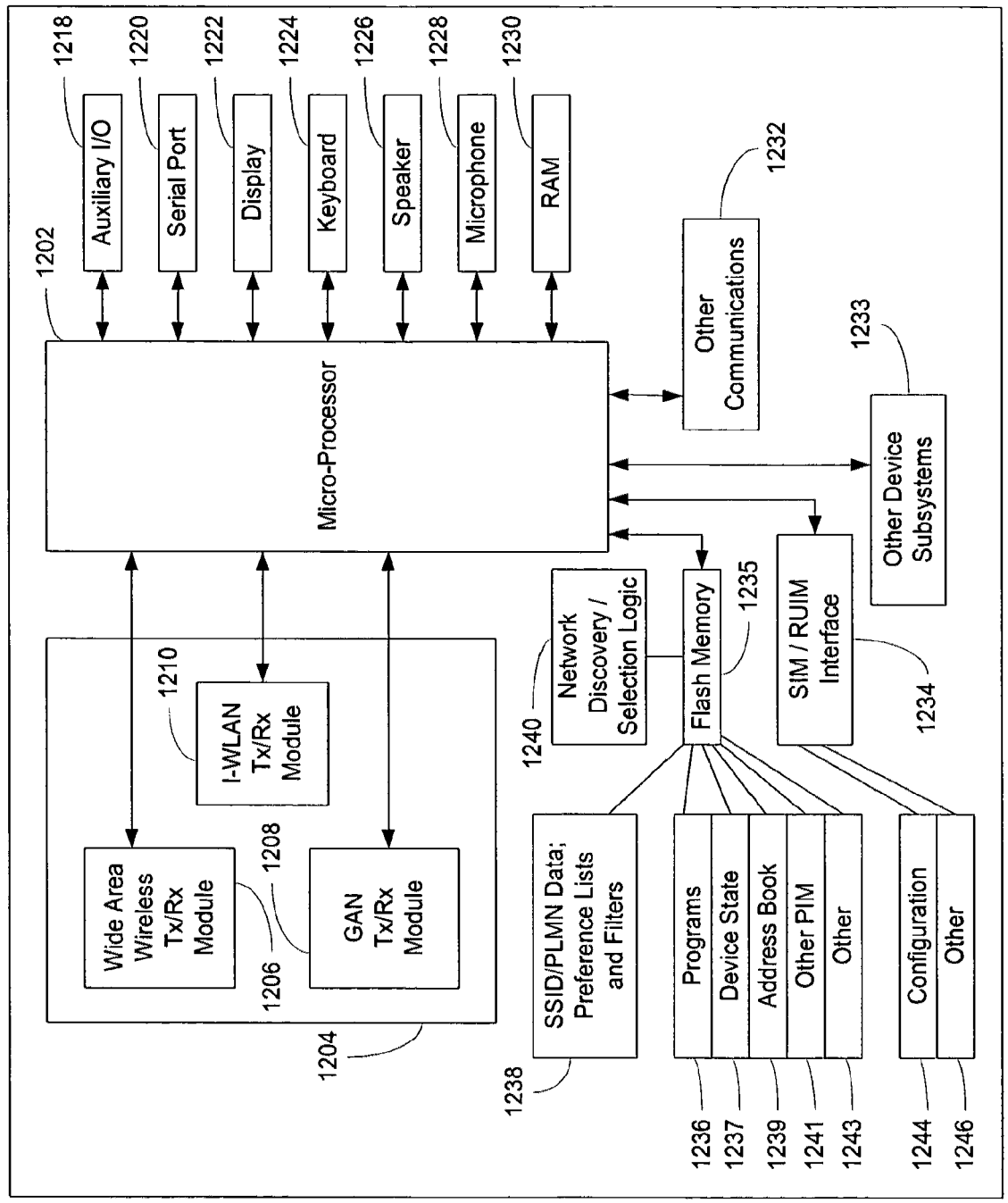
FIG. 10 depicts a block diagram of an embodiment of a user equipment device operable to perform the network discovery/selection procedures set forth according to the teachings of the switchable configuration system.

Referring now to FIG. 10, depicted there is a block diagram of an embodiment of a UE device operable to perform the network discovery/selection procedures set forth according to the teachings of the switchable configuration system. Although an embodiment of UE 102 may comprise an arrangement similar to one shown in FIG. 10, there can be a number of variations and modifications, in hardware, software or firmware, with respect to the various modules depicted. Accordingly, the arrangement of FIG. 10 should be taken as illustrative rather than limiting with respect to the embodiments of the present patent disclosure. A microprocessor 1202 providing for the overall control of an embodiment of UE 102 is operably coupled to a communication subsystem 1204 which includes transmitter/receiver (transceiver) functionality for effectuating multi-mode communications over a plurality of bands. By way of example, a wide area wireless Tx/Rx module 1206, a Wireless LAN Tx/Rx module 1208 and the configuration module 16 are illustrated. The Wireless LAN Tx/Rx module 1208 is shown by way of example only and other technology modules may be adapted in its place. Another approach is to use GAN Tx/Rx, WLAN Tx/Rx and I-WLAN Tx/Rx modules. Moreover, other non WLAN Tx/Rx modules may be included for other bands of private wireless networks. Although not particularly shown, each Tx/Rx module may include other associated components such as one or more local oscillator (LO) modules, RF switches, RF bandpass filters, A/D and D/A converters, processing modules such as digital signal processors (DSP), local memory, etc. As will be apparent to those skilled in the field of communications, the particular design of the communication subsystem 1204 may be dependent upon the communications networks with which the UE device is intended to operate. In one embodiment, the communication subsystem 1204 is operable with both voice and data communications. In one embodiment, the switchable configuration system 10 may be implemented as the communication subsystem 1204.

Microprocessor 1202 also interfaces with further device subsystems such as auxiliary input/output (I/O) 1218, serial port 1220, display 1222, keyboard 1224, speaker 1226, microphone 1228, random access memory (RAM) 1230, a short-range communications subsystem 1232, and any other device subsystems generally labeled as reference numeral 1233. To control access, a subscriber identity module (SIM) or removable user identity module (RUIM) interface 1234 is also provided in communication with the microprocessor 1202. In one implementation, SIM/RUIM interface 1234 is operable with a SIM/RUIM card having a number of key configurations 1244 and other information 1246 such as identification and subscriber-related data as well as one or more SSID/PLMN lists and filters. Other interfaces can be used to control access, including a universal subscriber identity module (USIM), IMS SIM (ISIM) (where IMS is IP Multimedia Subsystem), and a removable user identity module (RUIM) as used in CDMA. In some cellular devices the subscription information is securely stored in device memory rather than being contained in a removable device.

Operating system software and other control software may be embodied in a persistent storage module (i.e., non-volatile storage) such as Flash memory 1235. In one implementation, Flash memory 1235 may be segregated into different areas, e.g., storage area for computer programs 1236 as well as data storage regions such as device state 1237, address book 1239, other personal information manager (PIM) data 1241, and other data storage areas generally labelled as reference numeral 1243. Additionally, appropriate network discovery/selection logic 1240 may be provided as part of the persistent storage for executing the various procedures, correlation techniques, and GANC selection mechanisms set forth in the preceding sections. Associated therewith is a storage module 1238 for storing the SSID/PLMN lists, selection/scanning filters, capability indicators, et cetera.

Configuration preferences can be stored in the handset control, thus tailoring it to various modes, such as Cellular+ private wireless network, Cellular—GAN, and Cellular—I-WLAN. Moreover, the handset can be tailored to have the preferred configuration change by time of day or location.

With the use of 3GPP and GAN-capable dual mode UEs, there are a number of ways that the user-experience can be improved. The following description provides a non-exhaustive synopsis that exemplifies some of the specific scenarios, with a view towards providing optimization for them, particularly in terms of: (i) rapid selection and system acquisition, and (ii) enabling the user (who knows where (s)he is) to select and acquire GAN. While this illustration is tailored to cellular and GAN, other illustrations for different configurations may also be implemented.

I. Use Case Scenario A: Turn-On Handset (i.e., UE) at Home

In this use case scenario, a user turns on a handset at home in the morning. There is no need to check for 3GPP WACN (cellular) signals. A specific setting for the device power-up is provided. It is possible to tailor that to the time setting, so that power-up within a time window is considered "at home" power-up; at other times, the standard check for 3GPP WACN signals may occur first. A check is made for <home AP>, or if user has entered it, <home AP> and nearby APs. If there are none, then 3GPP (cellular) is used.

II. Use Case Scenario B: Return Home

In this use case scenario, a user-control is provided to easily and quickly have the UE check for <home AP>. The user can use this when returning home. If three are no <home AP>, then 3GPP (cellular) is used.

III. Use Case Scenario C: Home-Related

This use case scenario involves a travel setting (i.e., roaming), that is effective until a predetermined <date:time> setting. Whether to check for local GAN/WLAN, and which particular one, is indicated. Repetitive scheduling—weekly or other, is also indicated.

IV. Use Case Scenario D: Specific Locations

This use case scenario involves repetitive visits. At work the user can store <work AP>. A user-control to easily and quickly have the handset check for <work AP> is provided. At a coffee shop/bakery, a user can store <coffee shop AP>. A user-control to easily and quickly have the handset check for <coffee shop AP> is provided. For temporary visits, for example at Hotel XYZ, the user can store <hotel xyz AP>. A user-control to easily and quickly have the handset check for <hotel AP> is provided. The GAN/I-WLAN may be a moving one (e.g., on an aircraft) and may or may not be associated with several PLMNs. There may be a cellular microcell on the aircraft, however, that may be identified in some manner, including a combination such as [MCC, MNC].

V. Use Case Scenario E: Using Location Information

Location information from a number of sources can be used to tailor the UE device to the user's patterns. Information sources include LAI/CGI, HPLMN, Other PLMNs whether preferred or forbidden, Assisted Global Positioning System (AGPS) or other non-cellular band location system, and Manual input.

VI. Use Case Scenario E: Tailoring of the System Selection

The locations may be individually used to tailor the mode of operation. Examples include connected to <home AP> [defined mode, e.g. GAN], connected to <work AP> [defined mode, e.g. GAN], connected to <[other] AP>, and so on.

Furthermore, the connectivity information may be specifically used to provide location information for Emergency Services, in certain cases. The full utilization of the information may require additions or changes in the information provided to the public safety answering point or PSAP (e.g., a 911 dispatch center, local fire or police department, an ambulance service or a regional office covering multiple services).

Additionally, further modifications may also be required to the interface and messages exchanged between the PSAP and the operator (PLMN), and in the PSAP itself. The information may be in the form of the address where the AP(s) are located, including floor, room number and description of the location of the room, together with an indication of the signal strength and the potential "spill-over" coverage.

The systems and methods according to the patent disclosure may be implemented by any hardware, software or a combination of hardware and software having the above described functions. The software code, either in its entirety or a part thereof, may be stored in a computer readable memory. Further, a computer data signal representing the software code which may be embedded in a carrier wave may be transmitted via a communication network. Such a computer readable memory and a computer data signal are also within the scope of the patent disclosure, as well as the hardware, software and combinations thereof.

While particular embodiments of the patent disclosure have been shown and described, changes and modifications may be made to such embodiments without departing from the true scope of the patent disclosure.

What is claimed is:

1. A switchable configuration system residing in a handset for switchably configuring the handset to remove or enable a private wireless network operation, the switchable configuration system comprising:
   a cellular transceiver;
   a private wireless network transceiver;
   a cellular control portion controlling both the cellular transceiver and the private wireless network transceiver in the cellular mode, wherein the private wireless network transceiver associates with the cellular control portion to start or restart the cellular control portion of the handset;
   a private wireless network control portion controlling the private wireless network transceiver when in the private wireless network mode; and
   a configuration module selecting one of the private wireless network mode and the cellular mode of the handset, the configuration module comprising means for simultaneously operating on a cellular network and on a private wireless network,
   wherein the configuration module determines an availability of a private wireless network signal, selects the cellular mode if a private wireless network signal is not available, and selects the private wireless network mode if the private wireless network signal is available.

2. The switchable configuration system as claimed in claim 1, wherein the private wireless network is an enterprise network.

3. The switchable configuration system as claimed in claim 1, wherein the configuration module comprises:
   a data collection unit determining and collecting available cellular and private wireless network bands; and
   a repository storing data collected by the data collection unit.

4. The switchable configuration system as claimed in claim 3, wherein the configuration logic unit configures the private wireless network transceiver to operate in a WLAN band.

5. The switchable configuration system as claimed in claim 3, wherein the private wireless technology bands are one of: wireless local area network bands;
unlicensed network bands;
non-cellular bands; and
industrial, scientific and medical (ISM) bands.

6. The switchable configuration system as claimed in claim 1, wherein the configuration module further comprises means for placing a call on either the private wireless network or the cellular network on hold while placing, accepting or resuming a call on the other network.

7. The switchable configuration system as claimed in claim 1, wherein the configuration module further comprises means for conferencing a call on the private wireless network with a call on the cellular network.

8. A handheld wireless device configurable to remove or enable a private wireless network operation, the device comprising:
   a cellular transceiver;
   a private wireless network transceiver;
   a cellular control portion controlling both the cellular transceiver and the private wireless network transceiver in the cellular mode, wherein the private wireless network transceiver associates with the cellular control portion of the handheld wireless device to start or restart the cellular control portion of the handset;
   a private wireless network control portion controlling the private wireless network transceiver when in the private wireless network mode; and
   a configuration module selecting one of the private wireless network mode and the cellular mode of the device, the configuration module comprising means for simultaneously operating on a cellular network and on a private wireless network,
   wherein the configuration module determines an availability of a private wireless network signal, selects the cellular mode if a private wireless network signal is not available, and selects the private wireless network mode if the private wireless network signal is available.

9. A method of switchably configuring a handset to remove or enable a private wireless network operation, the method comprising:
   in the handset, collecting available cellular and private wireless network bands, wherein the handset comprises means for simultaneously operating on a cellular network and on a private wireless network;
   storing collected available cellular and private wireless network bands in a repository in the handset;
   determining an availability of a private wireless network signal;
   selecting a cellular mode if a private wireless network signal is not available and a private wireless network mode if the private wireless network signal is available; and
   operating the handset in the selected mode of operation comprising:
      in the cellular mode, controlling a cellular transceiver and a private wireless network transceiver with a cellular control portion, wherein the private wireless network transceiver associates with the cellular control portion of the handset to start or restart the cellular control portion of the handset; and
      in the private wireless network mode, controlling the private wireless network transceiver with a private wireless network control portion.

10. The method as claimed in claim 9, wherein further comprising checking for location and private wireless network signal strength.

11. The method as claimed in claim 9, wherein the selecting comprises:
   determining that the handset is no longer receiving a private wireless network signal;
   checking for other private wireless network access points usable for private wireless network service;
   in response to determining that there are no other private wireless network access points, determining if there are access points able to access a public land mobile network; and
   in response to determining that there are public land mobile network access points, associating the private wireless network transceiver with the cellular control portion of the handset.

12. The method as claimed in claim 9, wherein the private wireless network is an enterprise network.

13. The method as claimed in claim 12, further comprising checking for location and enterprise signal strength.

14. The method as claimed in claim 12, wherein the private wireless network is one of:
   wireless local area network;
   unlicensed network; and
   non-cellular network.

15. The method as claimed in claim 14, further comprising checking for wireless local area network access points that provide access to private land mobile network internetworking wireless local area network or global area network service.

16. The method as claimed in claim 14, further comprising checking for cell global identification from cellular software.

17. The method as claimed in claim 9, wherein the associating the private wireless network transceiver with the cellular control portion of the handset includes restarting the cellular control portion of the handset.

18. The method as claimed in claim 9, wherein the private wireless network transceiver associates with the cellular control portion of the handset comprises without restarting the cellular control portion of the handset.

19. The method as claimed in claim 9, wherein the handset simultaneously operates on a cellular network and on a private wireless network.

20. The method as claimed in claim 19, further comprising:
   placing a call on either the private wireless network or on the cellular network on hold while placing, accepting or resuming a call on the other network.

21. The method as claimed in claim 19, further comprising:
   conferencing a call on the private wireless network with a call on the cellular network.

22. A non-transitory computer-readable medium for storing instructions or statements for use in the execution in a computer of a method of switchably configuring a handset to remove or enable a private wireless network operation, the method comprising:
   in the handset, collecting available cellular and private wireless network bands, wherein the handset comprises means for simultaneously operating on a cellular network and on a private wireless network;
   storing collected available cellular and private wireless network bands in a repository in the handset;
   determining an availability of a private wireless network signal;
   selecting a cellular mode if a private wireless network signal is not available and a private wireless network mode if the private wireless network signal is available; and
   operating the handset in the selected mode of operation comprising:
      in the cellular mode, controlling a cellular transceiver and a private wireless network transceiver with a cellular control portion, wherein the private wireless network transceiver associates with the cellular control portion of the handset to start or restart restarting the cellular control portion of the handset; and
      in the private wireless network mode, controlling the private wireless network transceiver with a private wireless network control portion.

\* \* \* \* \*